US009688561B2

(12) United States Patent
Hansen et al.

(10) Patent No.: US 9,688,561 B2
(45) Date of Patent: *Jun. 27, 2017

(54) PROCESS AND APPARATUS FOR MAKING A MINERAL MELT

(75) Inventors: Lars Elmekilde Hansen, Roskilde (DK); Lars Boellund, Slangerup (DK); Lars Kresten Hansen, Roskilde (DK); Peter Farkas Binderup Hansen, Birkerod (DK); Leif Moeller Jensen, Frederiksberg (DK)

(73) Assignee: ROCKWOOL INTERNATIONAL A/S, Hedelusene (DK)

( * ) Notice: Subject to any disclaimer, the term of this patent is extended or adjusted under 35 U.S.C. 154(b) by 777 days.

This patent is subject to a terminal disclaimer.

(21) Appl. No.: 12/522,485

(22) PCT Filed: Jan. 14, 2008

(86) PCT No.: PCT/EP2008/000215
§ 371 (c)(1),
(2), (4) Date: Oct. 13, 2009

(87) PCT Pub. No.: WO2008/086990
PCT Pub. Date: Jul. 24, 2008

(65) Prior Publication Data
US 2010/0043496 A1 Feb. 25, 2010

(30) Foreign Application Priority Data
Jan. 15, 2007 (EP) .................................... 07250137

(51) Int. Cl.
*C03B 3/02* (2006.01)
*C03B 5/12* (2006.01)
*C03B 5/235* (2006.01)

(52) U.S. Cl.
CPC ................ *C03B 3/026* (2013.01); *C03B 5/12* (2013.01); *C03B 5/235* (2013.01); *C03B 5/2353* (2013.01); *Y02P 40/55* (2015.11); *Y02P 40/57* (2015.11)

(58) Field of Classification Search
CPC ....................................................... C03B 3/026
(Continued)

(56) References Cited

U.S. PATENT DOCUMENTS 4,078,973 A * 3/1978 Choi et al. ...................... 201/21
4,381,934 A * 5/1983 Kunkle et al. ............... 65/134.4
(Continued)

FOREIGN PATENT DOCUMENTS

DE 296 03 480 4/1996
GB 904 807 8/1962
(Continued)

OTHER PUBLICATIONS

International Search Report corresponding to International Patent Application No. PCT/EP2008/000215, Jan. 14, 2008.

*Primary Examiner* — John Hoffmann
(74) *Attorney, Agent, or Firm* — McAndrews, Held & Malloy, Ltd.

(57) ABSTRACT

The invention relates to a method of making a mineral melt comprising providing a circulating combustion chamber (1) which comprises an upper zone (2), a lower zone (3) and a base zone (4), injecting particulate fuel, particulate mineral material and primary combustion gas which has optionally an oxygen level of at least 25% by volume into the upper zone of the circulating combustion chamber so that the fuel undergoes pyrolysis in the upper zone to produce char, thereby melting the particulate mineral materials to form a mineral melt and generating exhaust gases, injecting secondary combustion gas which has optionally an Oxygen level of at least 25% by volume into the lower zone of the circulating combustion chamber so that the char combusts, thereby completing combustion of the fuel, and separating (Continued)

the mineral melt from the hot exhaust gases so that the hot exhaust gases pass though an outlet in the circulating combustion chamber and the mineral melt collects in the base zone. The melt is optionally fiberized. The invention also relates to apparatus suitable for use in the method.

19 Claims, 1 Drawing Sheet

(58) Field of Classification Search
USPC .............................................. 65/134.4, 135.9
See application file for complete search history.

(56) References Cited

U.S. PATENT DOCUMENTS

| | | | | |
|---|---|---|---|---|
| 4,544,394 A | * | 10/1985 | Hnat | 65/27 |
| 4,597,771 A | * | 7/1986 | Cheng | 48/77 |
| 4,632,687 A | * | 12/1986 | Kunkle et al. | 65/27 |
| 4,634,461 A | * | 1/1987 | Demarest et al. | 65/27 |
| 4,957,527 A | * | 9/1990 | Hnat | 65/19 |
| 5,107,517 A | * | 4/1992 | Lauren | 373/18 |
| 5,114,122 A | * | 5/1992 | Hnat | 266/186 |
| 5,417,731 A | * | 5/1995 | LeBlanc et al. | 65/134.4 |
| 5,605,104 A | * | 2/1997 | Gross et al. | 110/346 |
| 5,849,058 A | * | 12/1998 | Takeshita et al. | 65/134.2 |
| 6,047,566 A | * | 4/2000 | Fleckenstein et al. | 65/134.8 |
| 7,143,610 B2 | * | 12/2006 | Cabrera-Llanos et al. | 65/356 |
| 2002/0005089 A1 | * | 1/2002 | Nagata et al. | 75/433 |
| 2005/0138964 A1 | | 6/2005 | Edlinger | |
| 2005/0172677 A1 | * | 8/2005 | Jensen et al. | 65/469 |

FOREIGN PATENT DOCUMENTS

| | | |
|---|---|---|
| WO | WO 03/002469 | 1/2003 |
| WO | WO 2008/086991 | 1/2008 |

\* cited by examiner

PROCESS AND APPARATUS FOR MAKING A MINERAL MELT

This application is a 371 National Phase filing of International Patent Application Serial No. PCT/EP2008/000215 filed Jan. 14, 2008, which claims priority to European Patent Application Serial No. 07250137.2 filed Jan. 15, 2007. Both of the above-referenced applications are incorporated herein by reference in their entirety.

BACKGROUND TO THE INVENTION

This invention relates to the production of a mineral melt by burning combustible material in the presence of inorganic particulate material and thereby forming a melt. The melt can then be fiberised to form mineral fibres or used in other industrial processes.

Traditionally, the normal way of producing a melt for slag, stone or rock fibres has been by means of a shaft furnace in which a self-supporting stack of inorganic particulate material is heated by combustion of combustible material in the furnace. The stack gradually melts and is replenished from the top, with melt draining down the stack and out from the bottom of the furnace. The normal furnace for this purpose is a cupola furnace.

It is necessary for the stack to be self-supporting and permeable to the combustion gases, which are generally generated by combustion of carbonaceous material in the stack. It is therefore necessary that everything in the stack is relatively coarse (in order that the stack is permeable) and has high physical strength and does not collapse until combustion or melting is well advanced. In practice this means that the carbonaceous material is coke and the particulate material is either coarsely crushed rock, stone or slag or is in the form of briquettes formed from fine particulate material.

Accordingly, if the material which is available is only available in finely divided form, it is necessary to incur the expense and inconvenience of forming it into briquettes. Briquetting usually uses sulphur-containing materials as binder, such as Portland cement with gypsum, and this means that the effluent is liable to have a high sulphur content, which has to be treated.

The cupola or other stack furnace system also has the disadvantage that conditions in the furnace always tend to be sufficiently reducing that some of the iron is reduced to metallic iron. This necessitates separating metallic iron from the melt, reduces wool production, leads to the provision of iron waste and also tends to incur the risk of corrosion in the zone containing iron and slag.

Another disadvantage is that the process does not have high thermal efficiency.

Despite these disadvantages, the process using a cupola or other stack furnace has been widely adopted throughout the world for the manufacture of rock, stone or slag fibres.

An alternative and entirely different system for the production of a mineral melt that avoids or reduces the disadvantages of the cupola system is disclosed in our earlier publication WO 03/002469. This system involves suspending powdered coal, or other fuel, in preheated combustion air and combusting the suspended fuel in the presence of suspended particulate mineral material in a circulating combustion chamber, i.e., a combustion chamber in which the suspended particulate materials and air circulate in a system which is or approaches a cyclone circulation system. This is commonly referred to as a cyclone furnace.

The suspension of coal in preheated air, and the particulate mineral material, are introduced through the top or close to the top of the combustion chamber. Within the combustion chamber, combustion of the particulate coal occurs and the particulate material is converted to melt. The melt and particulate material that is not yet melted is thrown onto the walls of the chamber by the circulating gases and will flow down the chamber.

In WO03/002469, the combustion chamber preferably leads downwards into a large settling tank which has a considerably enhanced volume. There may be a gas burner or other means for supplying extra energy to the settling tank to raise the temperature of the exhaust gases. The burner is positioned towards the top of the settling tank. The exhaust gases which are free of melt are taken from the settling tank or the combustion chamber up through a duct at the top of the chamber.

In order to increase the energy efficiency of the cyclone furnace in WO03/002469, the exhaust gases, which leave the circulating chamber at a temperature in the range of 1400 to 1700° C. are used to preheat the particulate material so as to use rather than waste this heat energy. This step can be carried out under conditions which reduce nitrogen oxides (NOx) which reduces the environmental effects of the exhaust gases. The exhaust gases then pass through another heat exchanger by which there is indirect heat exchange with the combustion air.

The cyclone furnace has significant advantages compared to cupola or other stack furnaces. With respect to fuel, it avoids the need for briquetting fine particles and a wide range of fuels can be used including, for example, plastic. Using a melting cyclone furnace eliminates the risk of reduction of the ores to iron and releases exhaust gases which are environmentally acceptable. The flexibility in melt capacity is much better than with a cupola furnace meaning that production can easily and quickly be switched, from, for example, 40% to 100% of total capacity so the time taken to respond to changing demands is greatly reduced. Furthermore, melting in a cyclone furnace is much quicker than is the case for a cupola furnace and is in the order of minutes, rather than in the order of hours.

Hence, using a melting cyclone furnace system is economically and environmentally desirable and the system disclosed in WO 03/002469 works well. There is, however, room for improvement in the process.

In particular, although several steps are taken to recycle the large amount of energy used in producing the melt, there is inevitably a large amount of energy that is lost due to the large volume of the settling tank and the high volume of combustion air which is used. It is desirable to increase the energy efficiency of the system further.

WO03/002469 suggests a second embodiment shown in FIG. 2 in which the settling tank is replaced by a relatively small collection zone at the base of the combustion chamber. Such systems would lead to increased energy efficiency due to the reduced volume of the apparatus through which energy is lost. However, the inventors have found that in this system the melt quality is reduced.

In processes for making mineral fibres, such as that in WO03/002469, the purity of the melt is extremely important as it has a direct effect on the quality of the mineral fibres produced.

U.S. Pat. No. 4,365,984 is also concerned with producing mineral wool using a melting cyclone furnace and involves feeding a particulate waste material containing inorganic non-combustible and organic combustible components into combustion air. As in WO03/002469, the system includes a large collection zone. The exhaust gases are cooled in a heat exchanger and the waste heat is said to be suitable for drying coal or other waste or can be used in other processes or for heating purposes. The fuel is coal which is pulverised. Coarse fuel particles are said not to burn completely and hence become entrapped in the molten slag.

U.S. Pat. No. 4,544,394 concerns a method of melting glass in a vortex reactor. The process is designed to use liquid or gaseous fuels. The fuels undergo preliminary combustion in a gas or oil fired suspension preheater before introduction into the vortex where they combust further.

U.S. Pat. No. 6,047,566 concerns a method for melting recycled silicate materials. Due to the need to oxidise organic materials that are present as impurities in the recycled silicate materials, a long dwelling time inside the combustion chamber is needed. In this document a pre-burner for combustion of the fuel and combustion air is provided externally of the combustion chamber.

U.S. Pat. No. 4,957,527 is concerned with making glass in a cyclone melt reactor. This document mentions that using ash containing fuels such as coal has in the past been difficult because of the ash contamination in the glass. The apparatus makes use of large preheated suspension chamber in which the mineral materials are melted prior to introduction into the cyclone chamber where separation and dispersion of the materials occurs.

Melting cyclones are also known in other fields, particularly the field of pyrometallurgic processes (such as in U.S. Pat. Nos. 4,566,903 and 5,282,883). In such processes, the end product is a molten metal and any molten mineral material that is present is a waste material. Therefore, the quality of the mineral melt is unimportant in such processes.

In US 2005/0039654, a cyclone chamber is used to combust fuel to generate energy for use for other purposes. Mineral material is not added to the system as the purpose is not to make a melt, but the fuel that can be used can be so-called "slagging coal" which contains some mineral materials that are not combustible but melt to form a slag when the coal is combusted. This publication is concerned with the selective use of oxygen enrichment at a point in the barrel of the cyclone combuster to maintain the slag in a molten form, to minimise NOx emissions and to minimise the escape of fine coal particles in the barrel. Air (referred to as a first or primary oxidant having an oxygen concentration of about 21% by volume) is introduced into the burner with the fuel. A second oxidant stream which has a concentration greater than the first can be introduced either into a region adjacent to the coal, or into the barrel. The second oxidant mixes with a portion of the first oxidant to give a region of mixed oxidant which is said to contain less than about 31% oxygen by volume (so the oxygen level of the total oxidant i.e. combustion gas is much lower than 31%). There is no suggestion in this publication to increase the levels of oxygen in both the primary and secondary air streams.

Hence, in known processes for making mineral fibres using a cyclone furnace, it has generally been necessary to use more than one chamber to carry out the process of combustion and melt collection.

The present invention is concerned with increasing the energy efficiency of known methods for making mineral fibres using the melting cyclone furnace system while ensuring that the quality of the melt is high.

SUMMARY OF THE INVENTION

According to a first aspect, the present invention provides a method of making a mineral melt comprising providing a circulating combustion chamber which comprises an upper zone, a lower zone and a base zone, injecting particulate fuel, particulate mineral material and primary combustion gas which has an oxygen level of at least 25% by volume into the upper zone of the circulating combustion chamber so that the fuel undergoes pyrolysis in the upper zone to produce char, thereby melting the particulate mineral materials to form a mineral melt and generating exhaust gases, injecting secondary combustion gas which has an oxygen level of at least 25% by volume into the lower zone of the circulating combustion chamber so that the char combusts, thereby completing combustion of the fuel, and separating the mineral melt from the hot exhaust gases so that the hot exhaust gases pass though an outlet in the circulating combustion chamber and the mineral melt collects in the base zone.

According to a second aspect, the invention provides an apparatus for making a mineral melt according to the first or third aspects of the invention, comprising a circulating combustion chamber which comprises a cylindrical top section, a bottom section and a base section, wherein the circulating combustion chamber comprises inlets in the top section for particulate fuel, particulate mineral material and primary combustion gas, one or more inlets in the bottom section for secondary combustion gas an outlet for exhaust gases and an outlet in the base section for mineral melt.

According to the third aspect, the invention provides a method of making mineral fibres comprising providing a circulating combustion chamber which comprises an upper zone, a lower zone and a base zone, injecting particulate fuel, particulate mineral material and primary combustion gas into the upper zone of the circulating combustion chamber so that the fuel undergoes pyrolysis in the upper zone to produce char, thereby melting the particulate mineral materials to form a mineral melt and generating exhaust gases, injecting secondary combustion gas into the lower zone of the circulating combustion chamber so that the char combusts, thereby completing combustion of the fuel, and separating the mineral melt from the hot exhaust gases so that the hot exhaust gases pass through an outlet in the circulating combustion chamber and the mineral melt collects in the base zone, and flowing the collected mineral melt through an outlet in the base zone to centrifugal fiberising apparatus and forming fibres.

It is essential in all aspects of the invention to inject secondary combustion gas into the lower zone of the circulating combustion chamber so that the char combusts in this region, thereby completing combustion of the fuel. This feature enables significant improvements in energy efficiency to be obtained while maintaining a good quality of mineral melt which is suitable for making mineral fibres.

Particulate fuels, such as coal, combust in a two-stage process. In the first stage, which is known as pyrolysis, the volatile compounds burn very quickly with rapid evolution of gas. This generates char particles which are rich in carbon. The second stage is combustion of the char particle which is much slower than the first stage. The second stage typically takes between 10 and 100 times longer than the first stage. Hence, while the first stage of combustion occurs almost instantaneously when a fuel particle enters a combustion chamber, the second stage does not normally occur unless the fuel has a significant residence time.

Typically, once the initial stage of combustion has taken place in the upper zone of the chamber, the char particle is thrown to the sides of the chamber and can become incorporated into the melt. In systems where the cyclone is preferably used to generate a mineral melt for subsequent formation into mineral fibres, as in the present invention, the quality of the melt exiting the furnace is of critical importance. If the fuel is incompletely combusted leaving some char in the melt, the melt quality will be poor and may include bubbles or other inhomogeneities.

In the past, cyclone furnaces for making mineral wool have tended to make use of a large second chamber or a large pre-combustion chamber. This leads to the high residence time between the initial stage of combustion and collection of the melt. Hence, the char particles generally have time to completely combust.

U.S. Pat. No. 4,365,984 suggests that coal particles should be pulverised to sizes below 3 mm (⅛ inch). However even very small fuel particles of around 70 μm exhibit problems with incomplete combustion. Below this size, coal particles tend to agglomerate so simply reducing the particle size of the fuel does not give a satisfactory solution to the problem of incomplete combustion.

In the present invention the problem of reduced melt quality caused by reduced chamber volumes and hence lower residence time, is solved by injecting secondary combustion gas into the lower zone of the combustion chamber. This allows the second stage of combustion of the fuel to take place much more rapidly than is usual in this zone where the oxygen levels are usually low.

Hence, the present invention allows the cyclone furnace to be compact and negates the need for a large tank before or after the cyclone chamber. As both the size of the chamber and the volume of the combustion gas are correlated with the energy needed to produce mineral fibres and the subsequent energy loss, the present invention results in more energy efficient systems. This has significant benefits in terms of increased economic viability and reduced environmental impact.

An essential feature in the first and second embodiments of the invention and a preferred feature in the third embodiment is the use of primary combustion gas which has a level of oxygen (at least 25% by volume) which is higher than that found in air (about 21% by volume) in the upper zone and the introduction of secondary combustion gas which also has a level of oxygen which is higher than that in air in the lower zone of the circulating combustion chamber. In the event that primary combustion air is introduced through more than one inlet, the level of oxygen in the primary combustion gas refers to the average level of oxygen in the primary combustion gas for the total amount of primary combustion air, i.e., an average of all inlets. The same applies to the level of oxygen in secondary gas.

This feature allows for a further reduction in the volume of the gases (as the oxygen is the only component of the combustion gas which is active) and means that the apparatus can be even more compact. The volume of combustion gas is proportional to the energy needed to produce the melt so the use of oxygen enriched air according to the invention has significant benefits in energy efficiency. Using oxygen-enriched air or pure oxygen also reduces the amount of nitrogen introduced to the system and hence also reduces the production of harmful NOx gases.

In a preferred embodiment, a further means of enabling burn-out of char particles is the provision of a siphon outlet. This also promotes effective heating of the melt by the flame and prevents char particles from leaving the chamber in the melt.

DETAILED DESCRIPTION OF THE INVENTION

The circulating combustion chamber in the present invention is of the type which is frequently referred to as a cyclone furnace. The construction of suitable cyclone furnaces is described in various patents including U.S. Pat. Nos. 3,855,951, 4,135,904, 4,553,997, 4,544,394, 4,957,527, 5,114,122 and 5,494,863.

The chamber is generally a vertical rather than a horizontal furnace. It normally has a cylindrical top section, a frustoconical bottom section and a base section but can be wholly cylindrical. The base section is preferably an integral part of the chamber and can be simply the end part of the frustoconical bottom region or can be a cylindrical section at the end of the bottom region.

The diameter of the base section is not larger than the diameter of the top section in contrast to traditional systems which often employ a tank at the base of the chamber of enhanced volume. The use of secondary gas in the lower zone which speeds up complete combustion of the fuel means that the system can be compact and a large collection tank is not required.

Thus in the invention, use of oxygen-enriched air or pure oxygen as the primary and secondary combustion gases allows for a compact combustion chamber to be used. Hence, it is preferred in the present invention that the combustion chamber is an integral chamber. By this, we mean that the chamber is not made up of component parts which can be separated from one another. The ability to use compact furnaces compared to prior art systems minimises the surface area losses of energy from the furnace. The chamber volume is preferably less than 25 $m^3$, preferably less than 20 $m^3$, or 15 $m^3$ and can be less than 10 $m^3$.

For example, to produce about 20 tons per hour of melt using 30% oxygen as the primary combustion gas, the volume of the circulating combustion chamber would need to be about 15 $m^3$. In comparison, when using pure oxygen as the primary combustion gas, the chamber volume would only need to be about 5 $m^3$. Therefore, when making use of the invention to allow the use of pure oxygen as the primary gas, a much smaller and hence much more energy efficient cyclone can be used for a particular throughput.

During use of the chamber in the method of the present invention, the chamber comprises an upper zone, a lower zone and a base zone.

The upper zone is characterised in that pyrolysis, the initial stage of combustion of the particulate fuel, takes place. This corresponds broadly to the cylindrical top section of the chamber. The particulate fuel and preferably also the particulate mineral material and primary combustion gas are injected into the upper zone. The chamber also includes the outlet through which hot exhaust gases pass, preferably in the upper zone. However, the hot gases may pass through an outlet in another region of the furnace.

Pyrolysis of the fuel in the upper zone creates char, a carbon rich material. The char particles are generally thrown onto the surfaces of the chamber by the circulating gases and flow, with the melt, down the surfaces of the chamber under the action of gravity.

The lower zone is characterised by the combustion of char. Hence, the lower zone generally corresponds to the frustoconical bottom section of the chamber, particularly the surfaces of the chamber in this section. Char particles may also be present on the surface of the top section, and floating on the melt in the base zone.

Hence the upper zone generally extends over the majority of the top section, of the chamber whereas the lower zone extends over the majority of the bottom section, particularly the surfaces of the bottom section of the chamber and may also extend to some extent on to the surfaces of the top section of the chamber.

Typically in the lower region of a circulating combustion chamber of the type which has separation of gas at the top and melt at the bottom, oxygen levels are low, even if an excess of oxygen has been added in the upper region. Therefore, char in traditional systems needs a long residence time to burn in this region. In the present invention, secondary combustion gas is injected into the lower zone to aid the second stage of combustion, i.e., combustion of the char particle. Therefore, complete combustion of the fuel occurs in the lower zone in the method of the present invention.

Pyrolysis of the fuel in the upper zone creates heat which causes the particulate mineral material to melt to form a mineral melt. The mineral melt is generally thrown onto the walls of the chamber by the action of the circulating gases and flows down the chamber to the base zone where it is collected.

In the base zone the melt is collected. Substantially no char is present in this zone as it has been substantially completely combusted in the lower zone.

The quality of the melt is important in the present invention as it should be suitable for use in making mineral fibres. As the present invention enables complete combustion of the fuel to take place, char particles that are deleterious for the mineral fibre product are substantially absent from the melt.

The base zone has an outlet for the mineral melt through which the melt passes as a stream. This stream is then subjected to fiberisation in any conventional manner, for instance using a cascade spinner or a spinning cup or any other conventional centrifugal fiberising process.

Alternatively, the mineral melt can be used in other industrial processes such as those for making granules of mineral materials from waste raw materials.

It is preferred that, at the point at which the outlet for mineral melt leaves the base zone of the chamber, it does not immediately extend down but, instead, the outlet is a siphon. By "a siphon" we mean that the outlet, which is usually a tube or guttering, initially has an upward orientation relative to the opening in the chamber and subsequently has a downward orientation before leading to the fiberising equipment.

As is normal with a siphon, the result is that, in order for the melt to leave the chamber, the melt bath inside the chamber must be deep enough to reach the vertically highest point of the siphon outlet. When this happens, gravity causes the melt to pass up through the upwardly oriented part of the siphon and then flow down the subsequent part of the siphon to the fiberising equipment. Hence, this creates an air-lock in the system which ensures that exhaust gases cannot escape from the base of the chamber.

Using a siphon is particularly advantageous in the embodiment where a particulate fuel, such as coal, is used and leads to improvements in the melt quality. This is due to the fact that char particles, which are fuel particles that have not combusted completely in the top or bottom sections of the chamber, may collect on top of the melt pool and float there. These char particles are prevented from exiting the chamber with the melt by the siphon.

By enabling the char particles to collect on the melt, their residence time in the chamber is increased compared to when a siphon is not used. Hence, the char particles can complete their combustion in the base zone to achieve full burn-out of the fuel. This ensures that the energy efficiency of the process is optimised.

Burn-out in the base zone of char particles floating on the melt is enhanced by the addition of secondary combustion gas into the bottom section of the circulating combustion chamber.

A further advantage relates to the relative proportions of iron II and iron III in the melt. Traditionally, cupola furnaces have been used to make mineral melts which have a highly reducing atmosphere. As a result of this, almost all the iron in melts produced by cupola furnaces is in the form of iron II. Iron II is good for the fire resistant properties of the fibres as it is converted to an iron III crystalline structure at high temperatures.

However, cyclone systems such as that of the present invention are far more oxidising, particularly when the primary gas is oxygen enriched air. In this case, a substantial proportion of the iron oxide in the melt can be in the form of iron III rather than iron II. When a siphon is used, the melt comes into contact with the char particles which are trapped floating on it. As the char particles are highly reducing, they act to reduce the iron III in the melt to iron II thereby ensuring good fire resistant properties for the fibres are maintained.

Both the initial stage of combustion in the upper zone and the second stage of combustion in the lower zone create hot exhaust gases. The gases circulate in the chamber and flow upwards eventually passing through an exit in the upper zone of the chamber.

The general motion of gases and suspended particulate material in the circulating combustion chamber is a cyclone motion. This is created by introduction of the primary combustion gas, as well as particulate fuel and mineral material, at an appropriate angle to sustain the swirling motion. The secondary combustion gas is also preferably introduced in the same direction so as to sustain the circulating currents.

In the first and third aspects of the invention, upper, lower and base zones are defined in terms of the various phases of the method of making a mineral melt. The second aspect of the invention relates to apparatus that is suitable for use in the method according to the first and third aspects of the invention. Hence, inlets for particulate fuel, particulate mineral material and primary combustion gas, as well as an outlet of hot exhaust gases, are provided in the cylindrical top section of the circulating combustion chamber which includes and generally corresponds to the upper zone during use of the apparatus. Secondary gas is injected into the bottom section of the circulating combustion chamber which includes and generally corresponds to the lower zone during use of the apparatus. The apparatus also comprises a base section in which the melt collects during use, which comprises an outlet for the mineral melt.

The particulate fuel used in the present invention can be any fuel which burns in a two stage process involving initial pyrolysis to form a char particle, followed by combustion of the char particle. The particulate fuel can be in liquid or solid form. Where the fuel is a liquid, it is used in the form of droplets, i.e., particles of liquid fuel. In this embodiment, the fuel can be particles of petroleum oil or other carbon based liquids.

However, the particulate fuel in the present invention is preferably solid. It is generally a carbonaceous material and can be any particulate carbonaceous material that has a suitable calorific value. The calorific value can be relatively low, for instance as low as 10000 kJ/kg or even as low as 5000 kJ/kg. Thus it may be, for instance, dried sewage sludge or paper waste. Preferably it has higher calorific value and may be spent pot liner from the aluminium industry, coal containing waste such as coal tailings, or powdered coal.

In a preferred embodiment, the fuel is powdered coal and may be coal fines but preferably some, and usually at least 50% and preferably at least 80% and usually all of the coal is made by milling lump coal, for instance using a ball mill. The coal, whether it is supplied initially as fines or lump, may be good quality coal or may be waste coal containing a high inorganic content, for instance 5 to 50% inorganic with the balance being carbon. Preferably the coal is mainly or wholly good quality coal for instance bituminous or sub-bituminous coal (ASTM D388 1984) and contains volatiles which promote ignition.

The fuel particles preferably have a particle size in the range from 50 to 1000 μm, preferably about 50 to 200 μm. Generally at least 90% of the particles (by weight) are in this range. The average is generally about 70 μm average size, with the range being 90% below 100 μm.

The fuel can be fed into the chamber through a feed pipe in a conventional manner to give a stream of fuel particles. This normally involves the use of a carrier gas in which the fuel particles are suspended. The carrier gas can be air, oxygen enriched air or pure oxygen preferably at ambient temperature to avoid flashbacks or a less reactive gas such as nitrogen. The carrier gas is considered to be part of the primary combustion gas. The primary combustion gas as a whole, which includes the carrier gas and other gas injected into the upper zone of the chamber, must have more oxygen than is typically present in air. The feed pipe is preferably cylindrical.

The particulate mineral material is any material that is suitable for making mineral fibres which can be glass fibres or rock, stone or slag fibres. Glass fibres typically have a chemical analysis, by weight of oxides, of above 10% $Na_2O+K_2$), below 3% iron as FeO, below 20% CaO+MgO, above 50% $SiO_2$ and below 5% $Al_2O_3$. Rock, stone or slag fibres typically have an analysis, by weight of oxides, of below 10% $Na_2O+K_2$), above 20% CaO+MgO above 3% iron as FeO, and below 50% $SiO_2$ and, often, above 10% $Al_2O_3$. The mineral material can be waste materials such as mineral fibres which have already been used or which have been rejected before use from other processes.

The particulate mineral material, which is melted in the chamber to produce the mineral melt, is introduced into the upper zone of the chamber so that it becomes suspended in the gases therein. The point at which the particulate mineral material is added is not critical and it can be mixed with the fuel and injected through the fuel feed pipe. It is, however, preferable to add the particulate mineral material into the burning fuel. This can be achieved by adding the particulate mineral material into the chamber though an inlet in a conventional way, for example at or near to the top of the chamber.

Primary combustion gas is introduced into the upper zone of the chamber and can be at ambient temperature or can be preheated. When the gas is heated, the maximum desirable temperature that the primary combustion gas is pre-heated to is around 600° C., and the preferred preheating is to between 300 and 600° C., most preferably to around 500 to 550° C. The primary combustion gas is enriched with oxygen compared to air and has at least 25% oxygen by volume, whereas air normally has about 21% by volume. By "oxygen-enriched air" we mean that the gas contains more oxygen than is naturally present in air and can, in addition, contain other gases that are naturally present in air. It can also contain other gases that are not normally present in air, such as propane or methane, providing the total level of oxygen remains over that normally present in air.

In the preferred embodiments the primary combustion gas is oxygen enriched air which comprises at least 30% or 35%, preferably at least 50%, most preferably at least 70% oxygen by volume or pure oxygen. In one embodiment, to optimise energy savings associated with the use of oxygen, with the increase cost of oxygen compared to air, the air comprises 30 to 50% oxygen. Where pure oxygen is used it is preferably at ambient temperature, rather than being preheated.

The primary combustion gas may be introduced through a feed pipe with the fuel suspended in it, especially when the gas is at a relatively low temperature. The fuel should not begin to combust in the fuel pipe before it enters the chamber (a phenomenon known as "flash back") so low gas temperatures are needed in this embodiment. However, the primary combustion gas is preferably introduced separately through one or more combustion gas inlets which can be located in the vicinity of the fuel feed pipe so that the combustion gas is directed into the chamber in the same region as the fuel, to allow for efficient mixing.

Whether or not they are introduced together, the speed at which the combustion gas is injected into the chamber is relatively low (preferably between 1 and 50 m/s), so as to minimise wear of the apparatus. When the fuel and mineral material are suspended in the combustion gas, the speed is preferably between 5 and 40 m/s. When they are introduced separately, which is preferred, the injection speed of the fuel is preferably 20 to 40 m/s.

It is desirable to ensure that the particulate fuel is mixed rapidly and thoroughly with the primary combustion gas as this ensures that the fuel is ignited rapidly so that it can undergo pyrolysis almost immediately after introduction into the chamber. Having thorough mixing also ensures that the residence time of the fuel particles in the primary combustion gas is more uniform thereby leading to more efficient fuel combustion.

To help ensure rapid and thorough mixing in one embodiment of the invention an additional gas can be introduced in the upper zone which travels at a higher speed than the primary combustion gas and the particulate fuel and, due to the speed differential, causes turbulence of the stream of fuel particles thereby breaking up the stream and ensuring rapid mixing. The additional gas is generally much less voluminous than the combustion gas and typically makes up less than 40% of the total gas injected into the combustion chamber, preferably between 10 and 30%. The additional gas can be any gas including air, nitrogen, oxygen, or a flammable gas such as propane or butane. The additional gas may be injected from an inlet so that it is adjacent the stream of fuel particles in the chamber but is preferably injected to an inlet that concentrically surrounds the fuel inlet. This concentric arrangement leads to efficient mixing, particularly where the additional gas inlet has a converging nozzle at its opening. The additional gas is preferably travelling at least 100 m/s faster than the fuel and the combustion gas, usually at least 250 m/s, preferably at least 300 m/s. In the most preferred embodiment, the injection speed of the additional gas is sonic, i.e, at or above the speed of sound.

Alternatively, the primary combustion gas itself is pure oxygen travelling at least 100 m/s faster than the fuel, usually at least 250 m/s. The oxygen primary combustion gas may be injected from an inlet so that it is adjacent the stream of fuel particles but is preferably injected to an inlet that concentrically surrounds the fuel inlet.

The secondary combustion gas is introduced into the lower zone of the chamber. As with the primary combustion gas, the secondary combustion gas can be at ambient temperature or preheated and contains at least 25% oxygen. Preferably the secondary combustion gas is oxygen enriched air which comprises at least 30% or 35%, preferably at least 50%, most preferably at least 70% oxygen by volume, or between 30 and 50% oxygen or pure oxygen. Throughout the description and claims by "pure oxygen" we mean oxygen of 92% purity or more obtained by e.g. the vacuum pressure swing absorption technique (VPSA) or it may be almost 100% pure oxygen obtained by a distillation method. The secondary combustion gas can be introduced in any conventional manner but is preferably introduced using an inlet which has a converging nozzle, otherwise known as a lance.

The secondary combustion gas can be injected from one inlet in the lower zone but is preferably injected from at least two, most preferably more than two such as three, four, five or six, preferably four inlets.

The inventors have found that adding combustion gas in the lower zone is very effective at ensuring full burn-out of the char particles created following pyrolysis in the upper zone. Adding oxygen at this point has been found to be much more effective than simply adding additional oxygen with the primary combustion air in the upper zone. The secondary combustion gas makes up less than half of the total combustion gas which includes the primary combustion gas, secondary combustion gas and any additional gas that is introduced which is combustible. Preferably, the secondary combustion gas makes up between 10 to 50%, preferably 20 to 40% of the total percentage of combustion gas.

In a preferred embodiment, an additional (or secondary) liquid or gaseous fuel is injected into the lower zone, and burns in the presence of the secondary combustion gas to form a flame in the lower zone. The relative amounts of the oxygen in the secondary combustion gas and the secondary liquid or gaseous fuel are selected so that there is an excess of oxygen following complete combustion of the secondary fuel in the secondary gas.

Injecting secondary fuel into the lower zone is advantageous as it can be used to regulate the temperature of the melt which has collected in the base zone. As this is the purpose, the secondary fuel is preferably injected towards the lower end of the lower zone, preferably in the lower half of the frustoconical bottom section of the chamber, so that it is close to the base zone. The secondary fuel can be any liquid or gaseous fuel that combusts immediately and completely. Hence it can not be solely the particulate materials that burn in two stages which are injected into the upper zone but can contain a minor proportion (less than 50% but volume, preferably less than 20, 10 or 5% by volume) of these materials. Preferred fuels are propane, methane or natural gas. The secondary fuel is present in a lower amount than the particulate fuel and makes up less than 40%, typically 5 to 15% of the total fuel energy.

In this embodiment the secondary combustion gas is preferably pure oxygen and is introduced through a burner inlet with the fuel so that combustion occurs immediately. Alternatively, the secondary combustion gas can be introduced through an inlet close to the inlet for the secondary fuel and mixing can take place in the chamber.

FIGURES

Figure 1:
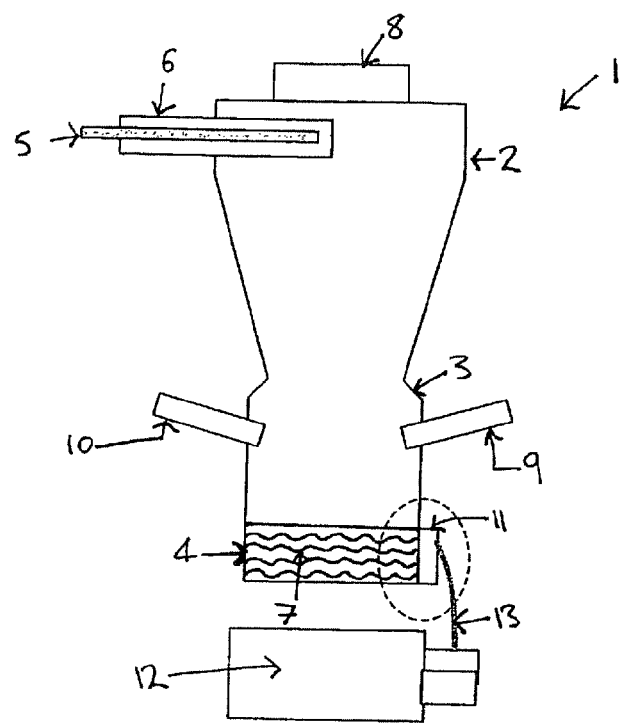
FIG. 1 is an illustration of apparatus which is suitable for use in a preferred embodiment of the present invention.

FIG. 1 shows a circulating combustion chamber 1 which comprises a top section 2, a bottom section 3 and a base section 4. Primary fuel and particulate material are introduced through inlet 5 with primary combustion gas being introduced through inlet 6 which concentrically surrounds inlet 5. The primary fuel is ignited and burns in the upper section 2 and is collected in the base section 4 as a melt pool 7. The hot exhaust gases pass through the fuel gas outlet 8 at the top of the combustion chamber. Secondary fuel and secondary combustion gas are injected through an oxy-fuel burner 9 and form a flame in the bottom region 3 which acts to heat the melt pool 7. Further secondary combustion gas is introduced through oxygen vents 10 in the bottom region 3 which aids burn-out of the fuel in this region. The melt flows through siphon 11 to fiberising equipment 12 where it is formed into fibres.

Figure 2:
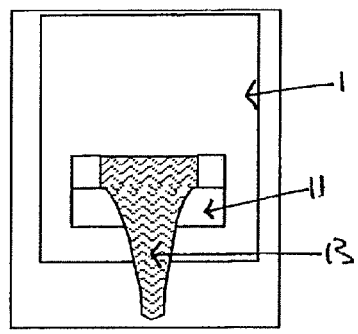
FIG. 2 is a front view of the siphon which is shown in the dotted oval of FIG. 1.

FIG. 2 shows a front view of the siphon 11 with a stream of melt 13 exiting the siphon 11.

Figure 3:
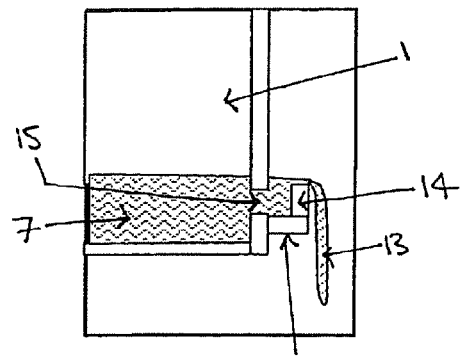
FIG. 3 is a side view of the siphon shown in the dotted oval of FIG. 1.

FIG. 3 shows a cross-section of the siphon 11 which has a part which is upwardly oriented 14 and rises vertically above the opening 15 in the chamber 1. Once the melt bath 7 gets above the level of the vertically oriented part 14, the melt flows over that part as stream 13.

The invention claimed is:

1. A method of making a mineral melt comprising
providing a cyclone furnace which comprises an upper zone, a lower zone below the upper zone, a base zone below the lower zone, an exhaust gas outlet in the upper zone, and a mineral melt outlet in the base zone,
injecting particulate fuel, particulate mineral material, and primary combustion gas which has an oxygen level of at least 25% by volume into the upper zone of the cyclone furnace so that particulate fuel undergoes pyrolysis in the upper zone to produce char, the particulate mineral material melts in the upper zone to form a mineral melt, the mineral melt collects in the base zone as a melt pool, and hot exhaust gases are formed in the upper zone,
injecting secondary combustion gas which has an oxygen level of at least 25% by volume into the lower zone of the cyclone furnace such that char combusts in the lower zone and hot exhaust gases are formed in the lower zone, and
separating the hot exhaust gases formed in the upper zone and the lower zone from the mineral melt so that hot exhaust gases pass through the exhaust gas outlet in the cyclone furnace.

2. A method according to claim 1, additionally comprising the step of making mineral fibers from the mineral melt by flowing the mineral melt from the melt pool through an outlet in the base zone to a fiberizer and forming fibers.

3. A method according to claim 1 wherein the lower zone of the cyclone furnace comprises plural lower zone inlets for the secondary combustion gas and the secondary combustion gas is injected into the lower zone through at least two lower zone inlets.

4. A method according to claim 1 wherein the secondary combustion gas is pure oxygen, the method further comprising adding liquid or gaseous fuel into the lower zone so as to form a flame in the lower zone.

5. A method of making mineral fibers comprising
providing a cyclone furnace which comprises an upper zone, a lower zone below the upper zone and a base zone below the lower zone, an exhaust gas outlet in the upper zone, and a mineral melt outlet in the base zone, injecting particulate fuel, particulate mineral material and primary combustion gas into the upper zone of the cyclone furnace so that particulate fuel undergoes pyrolysis in the upper zone to produce char, the particulate mineral material melts in the upper zone to form a mineral melt, the mineral melt collects in the base zone as a melt pool, and exhaust gases are formed in the upper zone, injecting secondary combustion gas into the lower zone of the cyclone furnace such that char combusts in the lower zone and hot exhaust gases are formed in the lower zone, separating the hot exhaust gases formed in the upper zone and the lower zone from the mineral melt so that hot exhaust gases pass through the exhaust gas outlet in the cyclone furnace, and flowing the mineral melt from the melt pool through a mineral melt outlet in the base zone to a fiberizer and forming fibers.

6. A method according to claim 5 wherein at least one of the primary and the secondary combustion gas is oxygen-enriched air which contains at least 30% oxygen by volume.

7. A method according to claim 6 wherein the oxygen enriched air contains at least 35% oxygen by volume.

8. A method according to claim 6 wherein the oxygen enriched air contains at least 50% oxygen by volume.

9. A method according to claim 5 wherein the secondary combustion gas is injected into the lower zone through at least two inlets.

10. A method according to claim 5 wherein the secondary combustion gas is pure oxygen, the method further comprising adding liquid or gaseous fuel into the lower zone so as to form a flame in the lower zone.

11. A method according to claim 5 wherein the secondary combustion gas is injected into the lower zone through at least three inlets.

12. A method according to claim 5 wherein the primary combustion gas is oxygen-enriched air which contains at least 25% oxygen by volume.

13. A method according to claim 5 wherein the secondary combustion gas is oxygen-enriched air which contains at least 25% oxygen by volume.

14. A method according to claim 5 wherein at least one of the primary and the secondary combustion gas is oxygen-enriched air which contains at least 70% oxygen by volume.

15. A method according to claim 5 wherein at least one of the primary and the secondary combustion gas is pure oxygen.

16. A method according to claim 5 wherein the fiberizer is a spinning cup.

17. A method according to claim 5 wherein the fiberizer is a cascade spinner.

18. A method according to claim 5 wherein the particulate fuel is solid.

19. A method according to claim 5 wherein the particulate fuel is coal.

* * * * *